(12) United States Patent
Nygård et al.

(10) Patent No.: US 10,024,474 B2
(45) Date of Patent: Jul. 17, 2018

(54) LOCKING DEVICE FOR PIPES

(71) Applicant: KONGSBERG ESCO AS, Kongsberg (NO)

(72) Inventors: Anders Nygård, Kongsberg (NO); Ole-Jakob Bjerke, Kongsberg (NO); Bjørn Bæver, Kongsberg (NO); Oddvar Danilin, Kongsberg (NO); Snorre Barlindhaug, Kongsberg (NO)

(73) Assignee: Kongsberg Esco A/S, Kongsberg (NO)

( * ) Notice: Subject to any disclaimer, the term of this patent is extended or adjusted under 35 U.S.C. 154(b) by 316 days.

(21) Appl. No.: 14/786,141

(22) PCT Filed: Apr. 22, 2014

(86) PCT No.: PCT/NO2014/050062
§ 371 (c)(1),
(2) Date: Oct. 21, 2015

(87) PCT Pub. No.: WO2014/175749
PCT Pub. Date: Oct. 30, 2014

(65) Prior Publication Data
US 2016/0069497 A1   Mar. 10, 2016

(30) Foreign Application Priority Data

Apr. 22, 2013   (NO) .................................. 20130558

(51) Int. Cl.
*F16L 25/06*   (2006.01)
*F16L 37/14*   (2006.01)
(Continued)

(52) U.S. Cl.
CPC ............. *F16L 37/142* (2013.01); *F16L 21/06* (2013.01); *F16L 25/0018* (2013.01); *F16L 25/06* (2013.01); *F16L 37/148* (2013.01)

(58) Field of Classification Search
CPC . F16L 37/142; F16L 37/0841; F16L 37/0844; F16L 37/088; F16L 37/148;
(Continued)

(56) References Cited

U.S. PATENT DOCUMENTS 2,241,089 A * 5/1941 Hampe ................... F16L 21/06
285/332
2,389,825 A 11/1945 Smith
(Continued)

FOREIGN PATENT DOCUMENTS

EP   0719971 A1   7/1996
EP   1336790 A1   8/2003
(Continued)

OTHER PUBLICATIONS

Search Report dated Nov. 22, 2013 in corresponding Norwegian application No. 20130558.
(Continued)

*Primary Examiner* — David Bochna
*Assistant Examiner* — James A Linford
(74) *Attorney, Agent, or Firm* — Knobbe, Martens, Olson & Bear, LLP (57) ABSTRACT

A locking device for pipes, comprising an inner and an outer pipe provided with adjoining and corresponding circumferential grooves for releasable locking engagement via a locking ring fitted in the grooves and thus releasable locking between the inner and the outer pipe by alteration of the radius of the locking ring, wherein the locking ring has an open section or circle sector along the periphery thereof and is provided, at least at the two radial ends thereof, interrupted by the open section, with two respective guide members comprising respective guide surfaces that are slanted relative to the periphery, and wherein a first one of the guide members is provided with an end stop and a
(Continued)

second one of the guide members is provided with a control mechanism protruding through an oblong opening provided through the outer pipe along a portion of its radial groove, wherein the radial displacement of the control mechanism along the oblong opening increases the open section or circle sector of the locking ring while simultaneously forcing the radius of the locking ring to increase for release of the locking engagement owing to the slanted guide surfaces.

11 Claims, 8 Drawing Sheets

(51) Int. Cl.
*F16L 21/06* (2006.01)
*F16L 25/00* (2006.01)

(58) Field of Classification Search
CPC ....... F16L 21/06; F16L 25/0018; F16L 25/06; Y10T 24/1412; Y10T 24/1424; F16B 7/0406; F16B 21/16; F16B 21/18; F16B 21/183
USPC ........ 285/314, 315, 316, 321; 403/289, 290; 267/159
See application file for complete search history.

(56) References Cited

U.S. PATENT DOCUMENTS

| | | | |
|---|---|---|---|
| 3,352,576 A * | 11/1967 | Thorne-Thomsen | F16L 37/088 285/148.2 |
| 5,131,687 A * | 7/1992 | Marchou | F16L 33/22 285/23 |
| 5,498,042 A | 3/1996 | Dole | |
| 2004/0150225 A1 | 8/2004 | Roberts et al. | |
| 2010/0089494 A1 | 4/2010 | Brady | |

FOREIGN PATENT DOCUMENTS

| | | |
|---|---|---|
| EP | 1659325 A2 | 5/2006 |
| EP | 2213924 A1 | 8/2010 |
| EP | 2623832 A2 | 8/2013 |
| GB | 570671 | 7/1945 |
| WO | 2007/000023 A1 | 1/2007 |

OTHER PUBLICATIONS

Supplementary European Search Report, dated Nov. 4, 2016 in corresponding European application No. 14788588.

* cited by examiner

LOCKING DEVICE FOR PIPES

CROSS-REFERENCE TO RELATED APPLICATIONS

This application is the U.S. National Phase under 35. U.S.C. § 371 of International Application PCT/NO2014/050062, filed Apr. 22, 2014, which claims priority to Norwegian Patent Application No. 20130558, filed Apr. 22, 2013. The disclosures of the above-described applications are hereby incorporated by reference in their entirety.

The invention relates to a locking device for pipes, and more specifically a locking device for pipes.

In many situations it is desirable to lock two pipe ends or sockets to one another, for example, in connection with coupling between valves or flanges and pipes in drinking water networks buried in the ground, and with the drinking water network valves typically arranged in confined manholes where, owing to the force of the water pressure, flexible connectors are required.

In the area of drinking water networks and valves utilized therein, there are previously known solutions wherein bolts are passed through respective flanges on two pipe ends that are to be connected together, in addition to more sophisticated solutions where a locking string is passed into circumferential grooves made up of corresponding recesses in an inner and an outer pipe mated together. The first solution mentioned is cumbersome and space-demanding, while the latter solution also leaves room for improvement since it may involve difficulties in passing the locking string into the circumferential groove through the corresponding small hole in the outer pipe that is provided for insertion of the locking string.

The present invention seeks to solve the aforementioned or other problems and deficiencies with a locking device. In an advantageous embodiment of the invention the locking device is provided with a plurality of parallel circumferential grooves in the longitudinal direction of the inner pipe, so that the relationship between the lengths of the inner and outer pipe may be varied by the selection of the groove.

The present invention is described in more detail in the following, as non-limiting embodiments, and with reference to the attached drawings, wherein.

Within the scope of the invention as disclosed in the claims, the terms "pipe," "pipe end," and the like also comprise other cylindrical elements such as a pipe coupling member or tubular socket of a valve or flange or other connectors in the area of pipe connection.

With reference to the figures, the locking device 1 according to the invention comprises an inner 2 and an outer 3 pipe provided with adjoining and corresponding circumferential grooves 4, 5 for releasable locking engagement via a locking ring 6 fitted in the grooves 4, 5 and thus releasable locking between the inner 2 and the outer 3 pipe by alteration of the radius of locking ring 6. As is especially apparent from FIGS. 5 and 9, locking ring 6 has an open section or circle sector 7 along the periphery O thereof and is provided, at least at the two radial ends 8, 9 thereof, interrupted by the open section 7, with two respective guide members 10, 11 comprising respective guide surfaces that are slanted relative to periphery O. A first one of the guide members 10 is provided with an end stop 12, and a second one of the guide members is provided with a control mechanism 13 protruding through an oblong opening 14 provided through the outer pipe 3 along a portion of its radial groove 5. Hence, radial displacement of control mechanism 13 along oblong opening 14 increases the open section or circle sector 7 of locking ring 6 while simultaneously forcing the radius of locking ring 6 to increase for the release of the locking engagement owing to the slanted guide surfaces.

Figure 1:
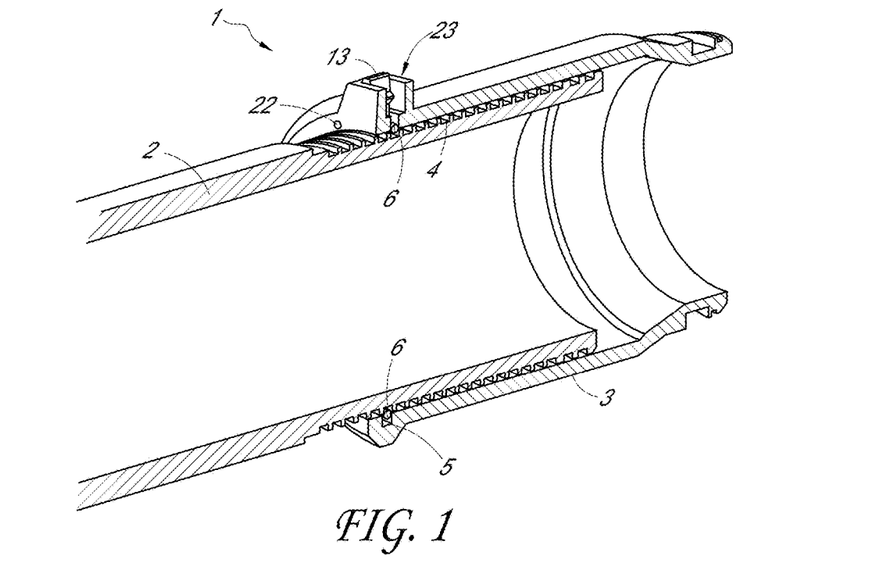
FIG. 1 is a longitudinal section drawing of a first embodiment of the invention, with the locking device in locked position.
Figure 2:
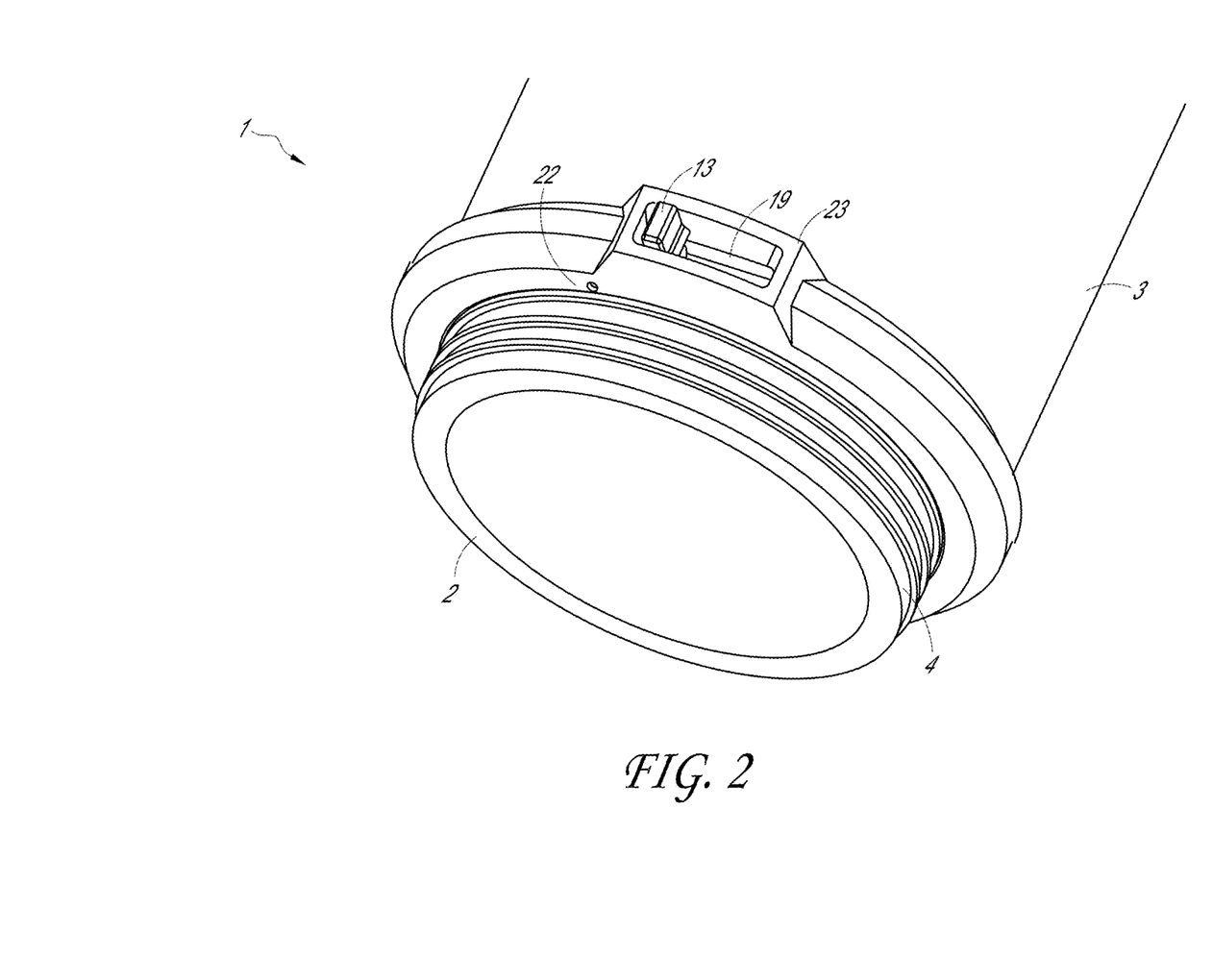
FIG. 2 is a perspective drawing of the locking device in FIG. 1, with the locking device in locked position.
Figure 3:
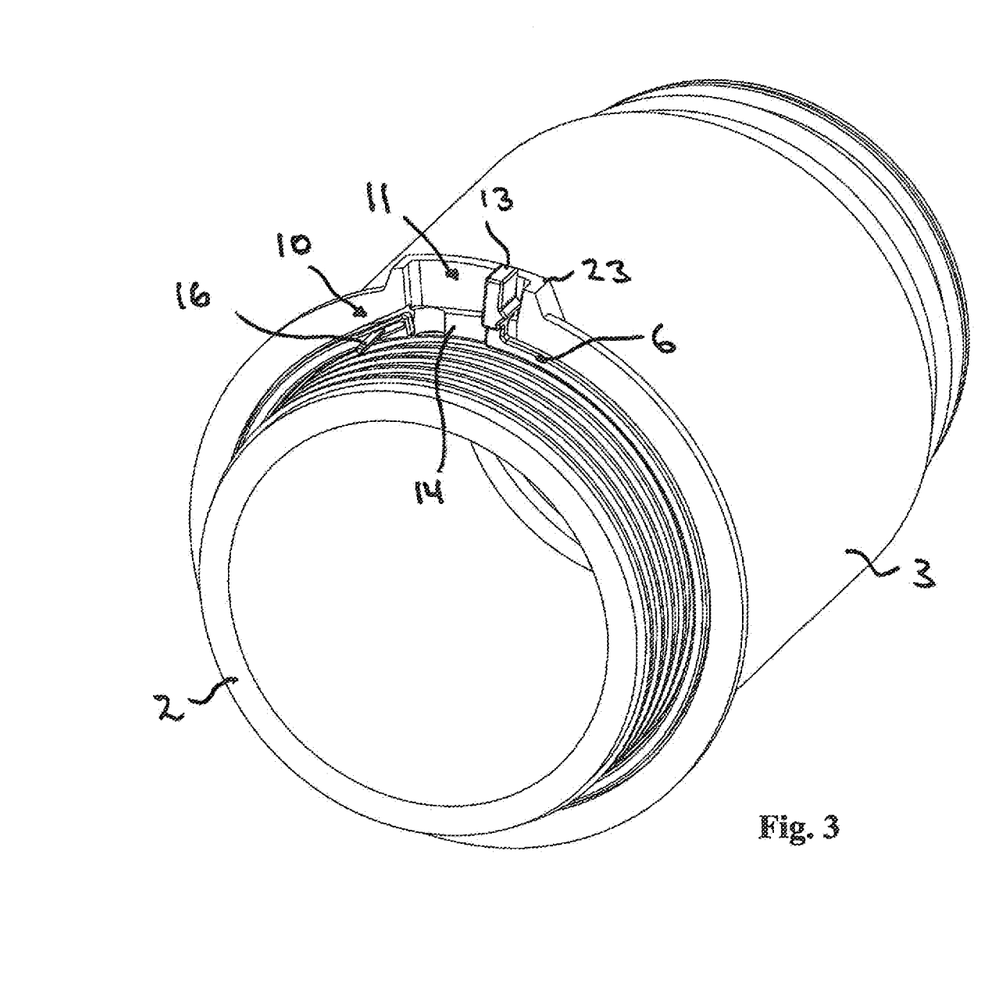
FIG. 3 is a partial section drawing of the locking device in FIGS. 1 and 2, with the locking device in unlocked position.
Figure 4:
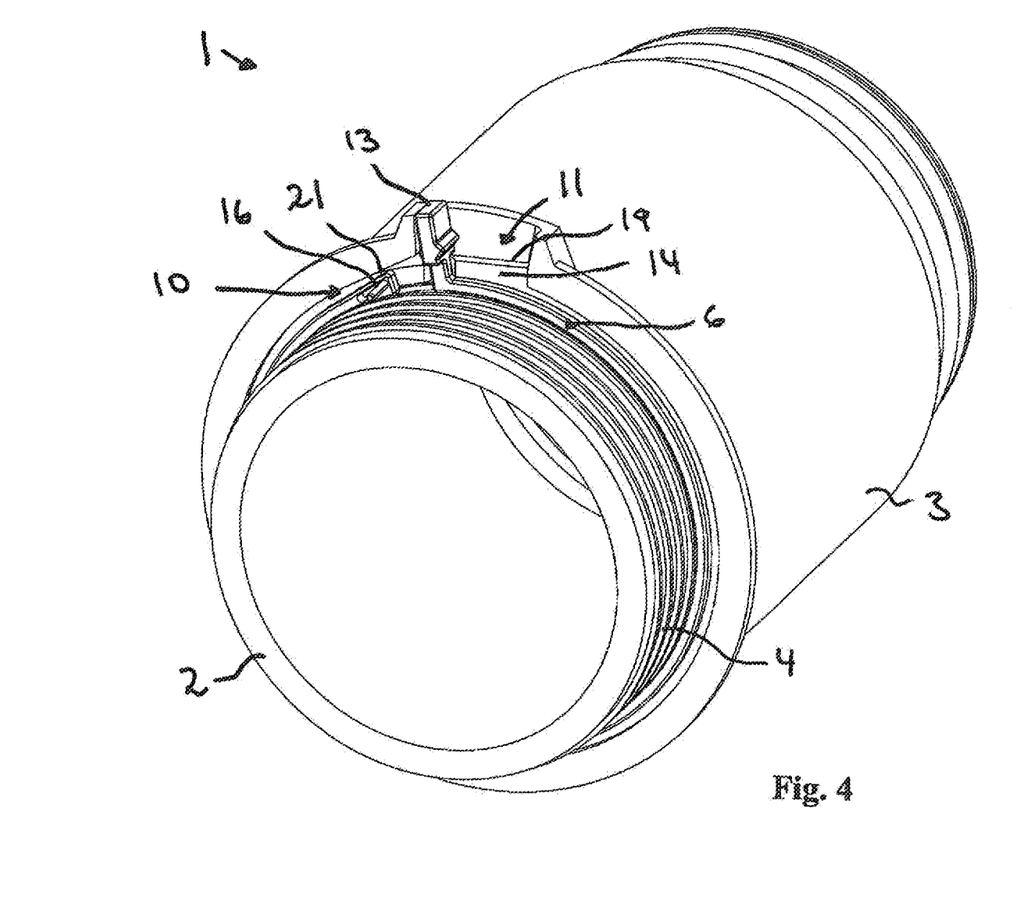
FIG. 4 is a partial section drawing of the locking device in FIGS. 1 to 3, with the locking device in locked position.

On inner pipe 2, and with special reference to FIG. 1, there are advantageously provided a plurality of circumferential grooves 4, arranged in parallel along the longitudinal direction of inner pipe 2, for optional locking in a plurality of locking positions.

In the second embodiment of the invention, shown in FIGS. 6 to 9, there are advantageously provided a number, advantageously two, of additional guide members 10 corresponding to the first guide member 10 along periphery O of locking ring 6, said guide members 10 being distributed substantially evenly along periphery O of locking ring 6. This permits a potentially more uniform and controlled engagement and release of engagement for locking ring 6 in grooves 4, 5 than is possible with the first embodiment, where guide members 10, 11 are provided only at the two ends of locking ring 6.

The at least one guide member 10 is advantageously provided as a slanted opening or slot 15 in locking ring 6 and by a corresponding pin 16 mounted in outer pipe 3, where pin 16 slides into slot 15 when the open section or circle sector 7 of locking ring 6 is altered.

Figure 5:
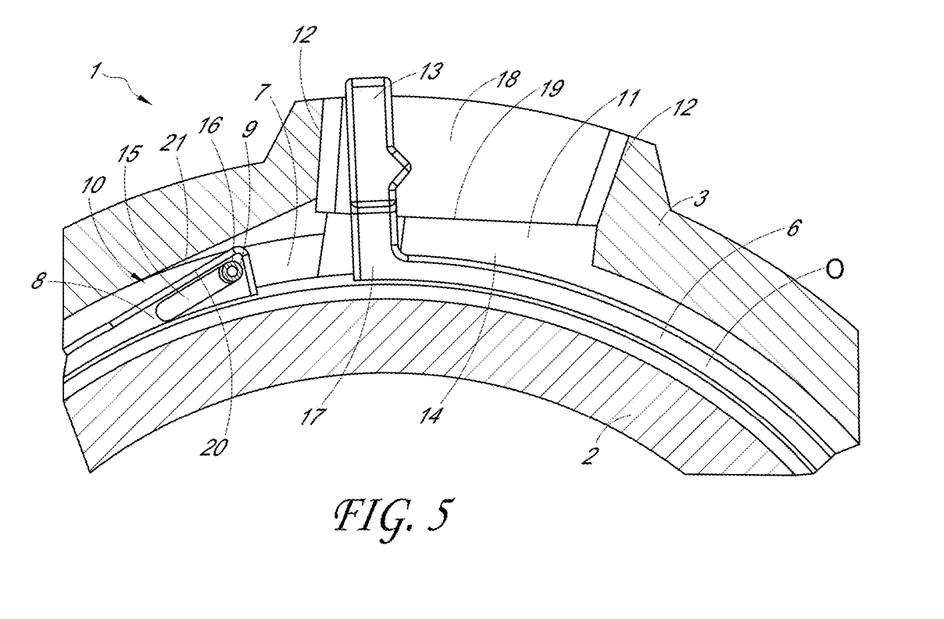
FIG. 5 is a detail drawing of a portion of the locking device in FIGS. 1 to 4, with the locking device in locked position.
Figure 6:
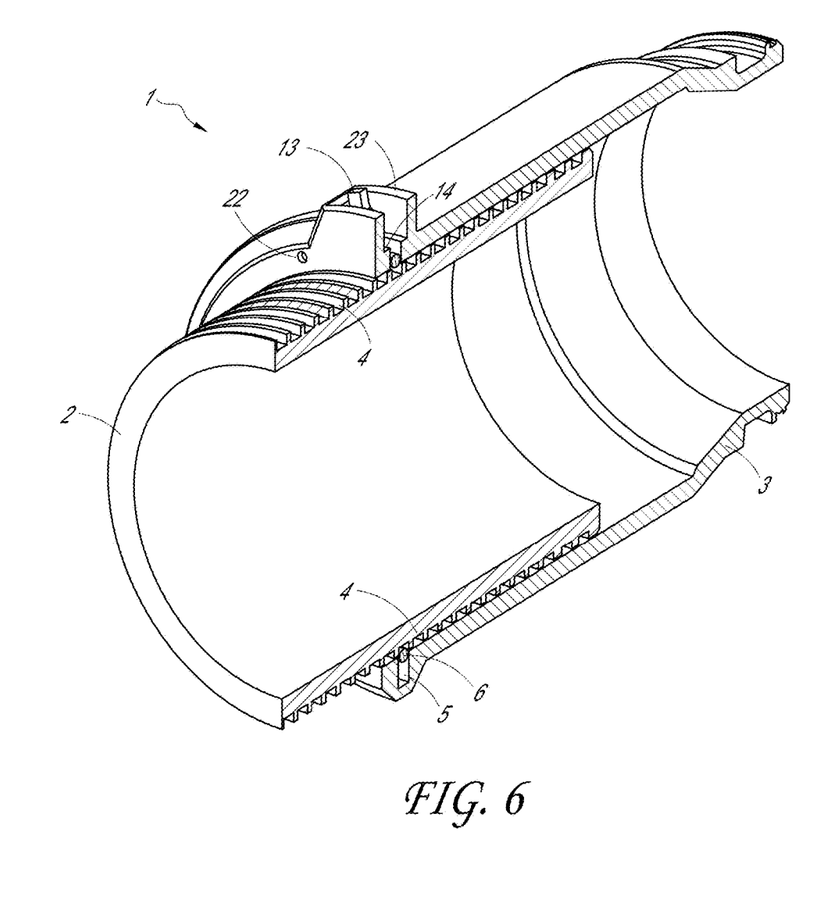
FIG. 6 is a longitudinal section drawing of a second embodiment of the invention, with the locking device in locked position.
Figure 7:
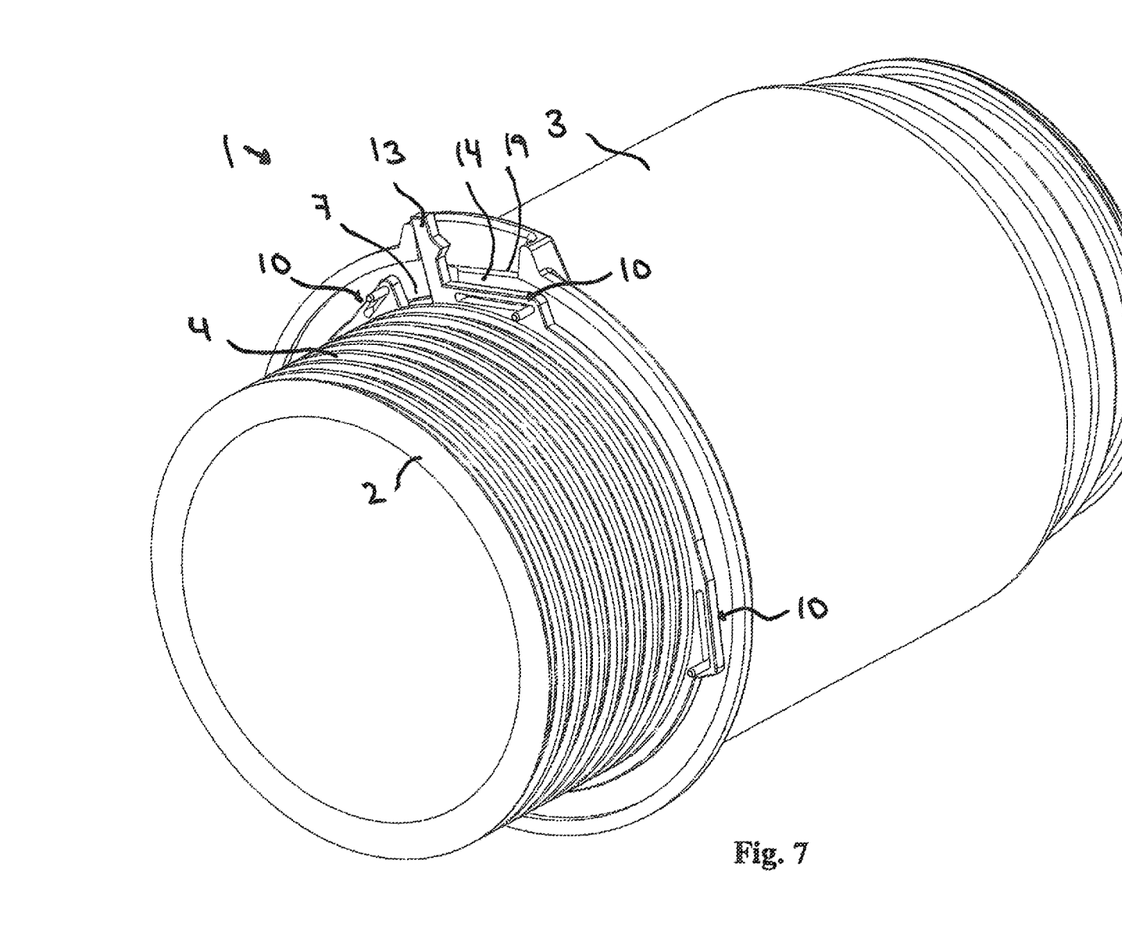
FIG. 7 is a partial section drawing of the locking device in FIG. 6 with the locking device in locked position.
Figure 8:
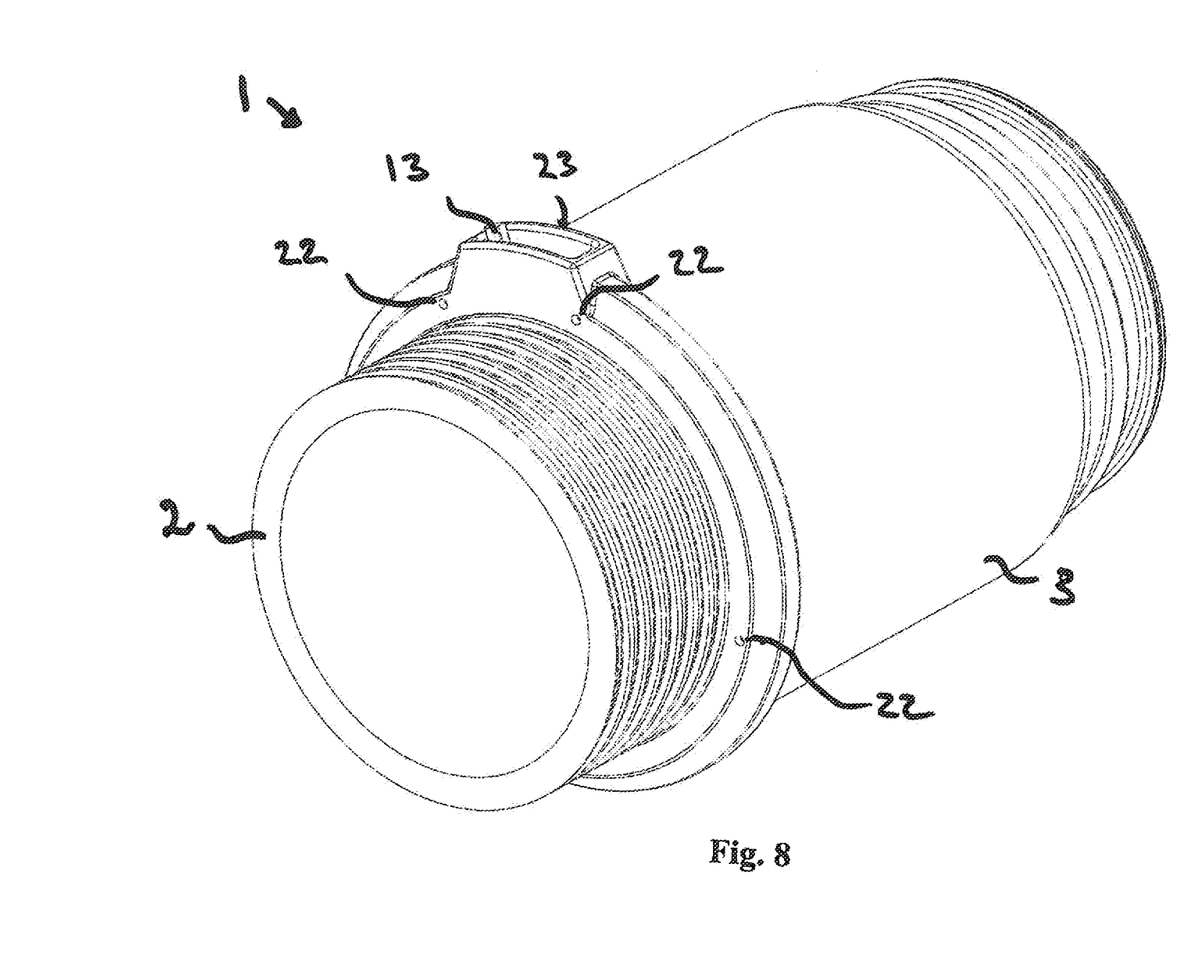
FIG. 8 is a perspective drawing of the locking device in FIGS. 6 and 7, with the locking device in locked position.
Figure 9:
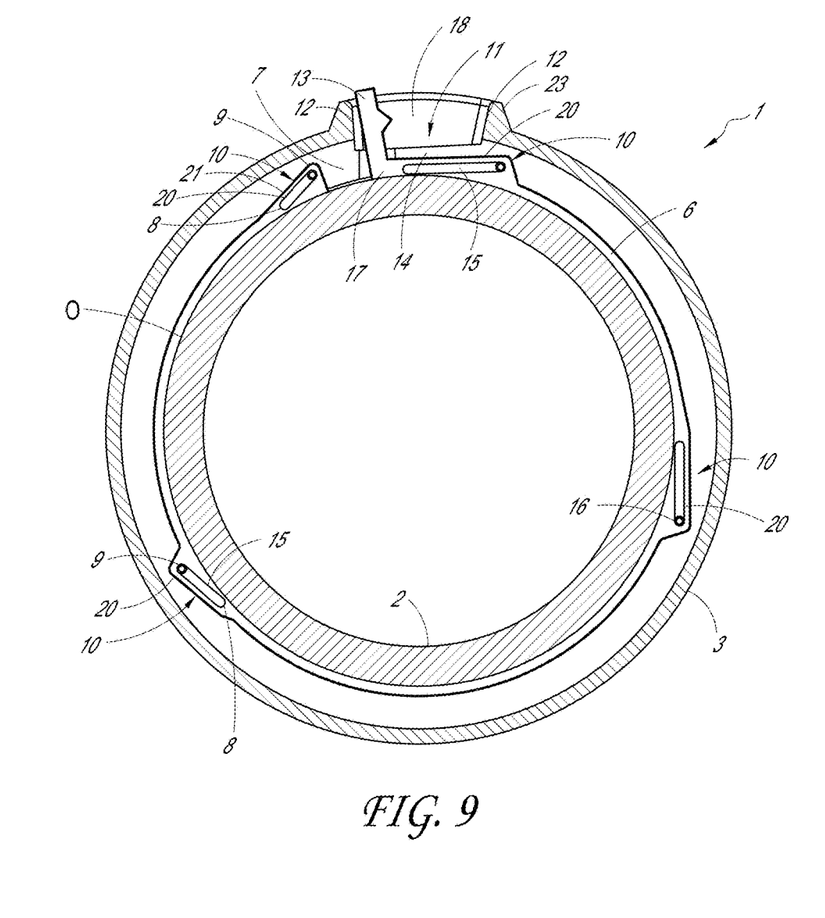
FIG. 9 is a detail drawing of a portion of the locking device in FIGS. 6 to 8, with the locking device in locked position.

Control mechanism 13 is advantageously a lever coupled to an angled radial end 17 of locking ring 6 operatively connected to the second guide member 11, and provided with a surface 18 for sliding contact with the slanted guide surface 19 of second guide member 11, as shown particularly on FIGS. 5 and 9.

The slanted openings or slots 15 in locking ring 6 are advantageously provided in radially protruding sections 20 on locking ring 6. In addition, in the circumferential groove 5 on outer pipe 3 there are provided corresponding recessed sections 21 in order to substantially accommodate the radially protruding sections 20 in an unlocked position for locking ring 6.

The at least one pin 16 is advantageously mounted in a corresponding through-going opening 22 from the inside of groove 5 and to the exterior of outer pipe 3.

Guide surfaces 15, 19 advantageously are ascending substantially tangentially relative to periphery O of the locking ring, but in embodiments not shown nor further described they may be non-linear, as when ascending exponentially, and with a correspondingly short operating range for control mechanism 13 between locked and unlocked position.

Locking device 1 is advantageously in locked position when control mechanism 13 is not operated, with locking device 1 being brought into unlocked position by increasing of the open or interrupted section 7 of locking ring 6 against the spring action of locking ring 6. Alternatively, or in addition, there may be provided non-illustrated means connected to control mechanism 13 to ensure that locking ring 6 remains in the desired position.

To provide additional protection for control mechanism 13, this lever is advantageously mounted in a recess 23 on the exterior of outer pipe 3, as is shown by the figures.

Although the second embodiment in FIG. 9 is shown with both a guide surface 19 and a guide surface/slot 15 associated with second guide member 11, it will be apparent to the person skilled in the art, on the basis of the description, that it is sufficient that guide surface/slot 15 and its operatively associated pin 16 are active on operation of the control mechanism or lever 13, and that it is thus not necessary to provide any sliding surface 18 associated with lever 13.

The invention is not limited to the embodiments shown and described above, but may be varied within the scope of the claims.

What is claimed is:

1. A locking device for pipes, comprising:
   an inner pipe comprising a plurality of circumferential grooves,
   an outer pipe comprising a radial groove,
   a locking ring adapted to fit in the radial groove and at least one of the respective circumferential grooves,
   a first guide member comprising a guide surface slanted relative to a periphery of the locking ring, and
   a second guide member provided with a control mechanism protruding through an oblong opening provided through the outer pipe along a portion of the radial groove, said second guide member comprising a guide surface slanted relative to a periphery of the locking ring
   wherein:
   the locking ring comprises an open section forming a split, and configured to alter a radius thereof to provide releasable locking between the inner and the outer pipe by the alteration of the radius,
   a radial displacement of the control mechanism along the oblong opening increases the open section of the locking ring while simultaneously forcing the radius of the locking ring to increase for release of the locking engagement owing to the slanted guide surfaces.

2. The locking device according to claim 1, wherein the plurality of circumferential grooves are arranged in parallel along the longitudinal direction of the inner pipe, for optional locking in a plurality of locking positions.

3. The locking device according to claim 1, wherein a plurality of the first guide members are provided along the locking ring, said plurality of the first guide members being distributed substantially evenly along the periphery of locking ring.

4. The locking device according to claim 3, wherein three of the first guide member are provided along the periphery of locking ring, said guide members being distributed substantially evenly along the periphery of locking ring.

5. The locking device according to claim 1, wherein the first guide member is provided as a slanted slot in the locking ring and a corresponding pin mounted in the outer pipe, and
   said pin slides into the slot when the open section of the locking ring is altered.

6. The locking device according to claim 5, wherein the slanted slot in the locking ring is provided in a radially protruding section on the locking ring, and the radial groove on the outer pipe are provided a corresponding recessed section to accommodate the radially protruding section in an unlocked position for the locking ring.

7. The locking device according to claim 1, wherein the control mechanism is a lever coupled to an angled radial end of the locking ring operatively connected to the second guide member and provided with a surface for sliding contact with the slanted guide surface of the second guide member.

8. The locking device according to claim 1, wherein at least one pin is mounted in a corresponding through-going opening of the outer pipe from an inside of the radial groove and to an exterior of the outer pipe.

9. The locking device according to claim 1, wherein each of guide surfaces are ascending substantially tangentially relative to the periphery of the locking ring.

10. The locking device according to claim 1, wherein the locking device is in locked position when the control mechanism is not being operated, with locking device being brought into unlocked position by an increase of the open section of the locking ring against the spring action of the locking ring.

11. The locking device according to claim 1, wherein the control mechanism is protectively mounted in a recess on an exterior of the outer pipe.

\* \* \* \* \*